Aug. 6, 1940.  O. E. STAPLES  2,210,134
HOBBING MACHINE
Filed April 26, 1937  3 Sheets-Sheet 3

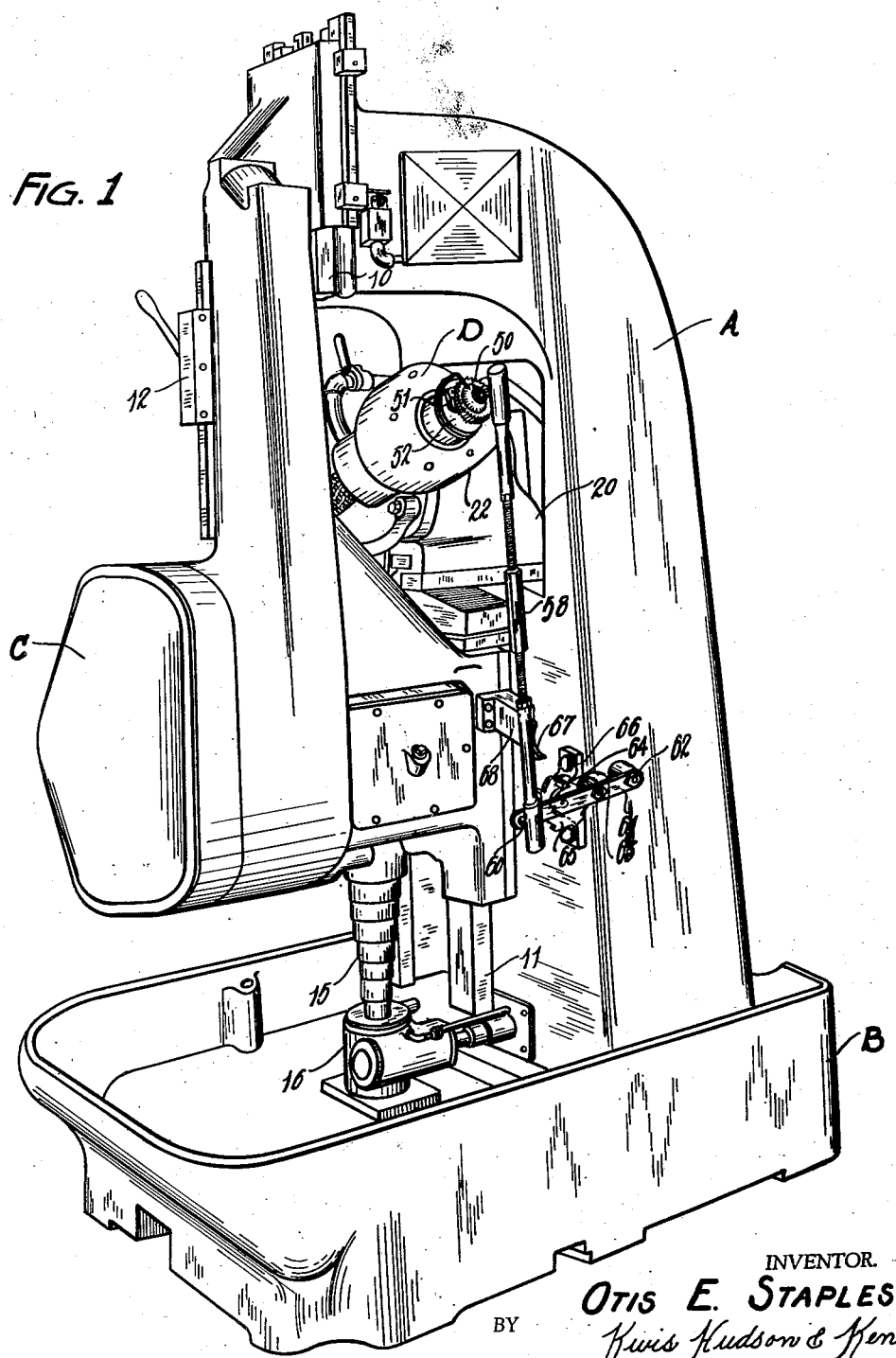

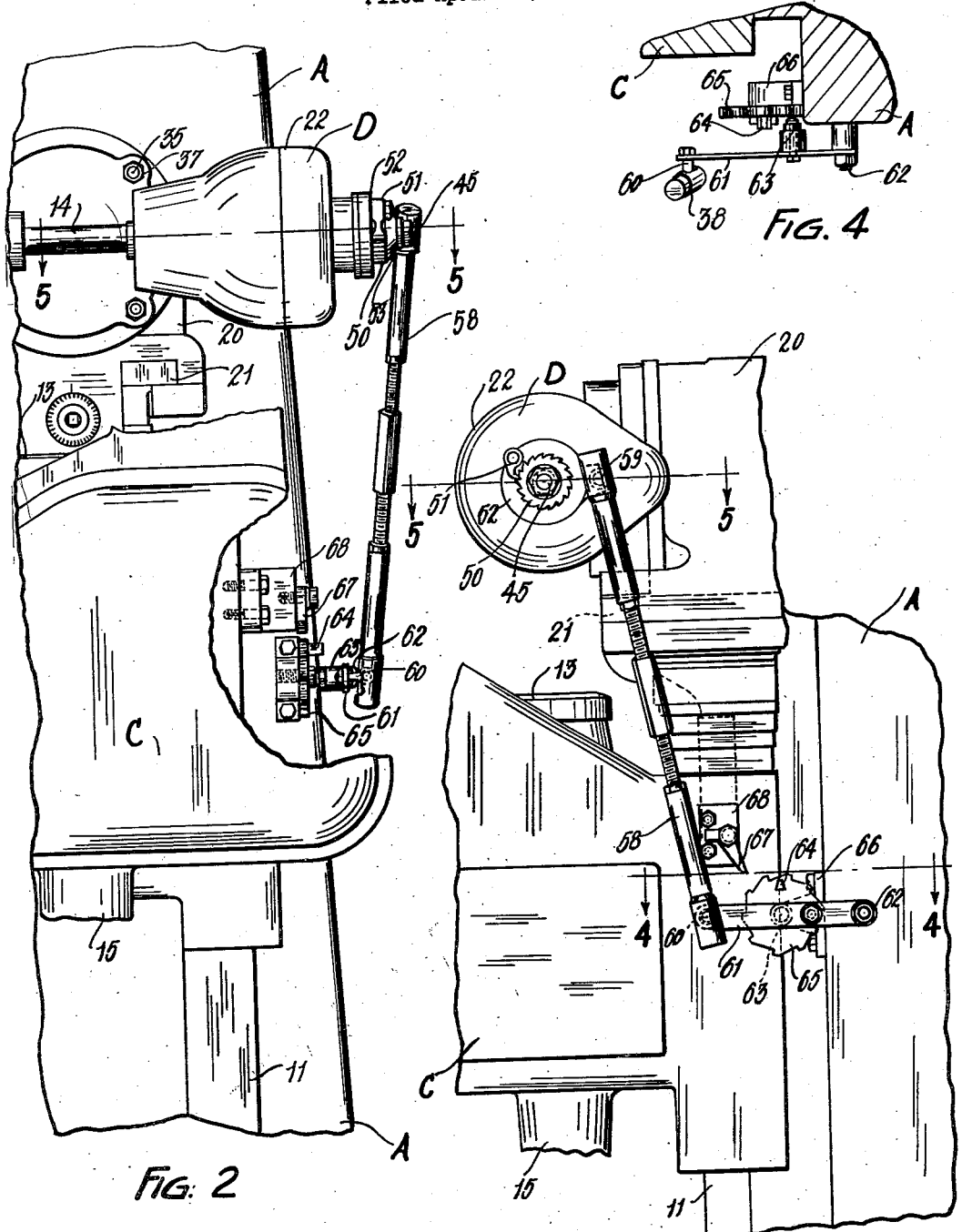

INVENTOR.
OTIS E. STAPLES
ATTORNEYS

Patented Aug. 6, 1940

2,210,134

UNITED STATES PATENT OFFICE 2,210,134

HOBBING MACHINE

Otis E. Staples, Cleveland, Ohio, assignor to The Cleveland Hobbing Machine Company, Cleveland, Ohio, a corporation of Ohio Application April 26, 1937, Serial No. 138,892

9 Claims. (Cl. 90—3)

The present invention relates to metal working machines and more particularly to hobbing machines such as employed in cutting gears and the like.

An object of the invention is the provision of a novel and improved hobbing machine comprising means for periodically and automatically effecting a relative movement between the hob or hob spindle and the work spindle transversely of the axis of rotation of the work spindle, or in a direction generally parallel with the axis of rotation of the tool or hob spindle, so as to periodically bring a new section of the hob into operative position with reference to the work.

Another object of the invention is the provision of a novel and improved hobbing machine comprising means for periodically and automatically shifting or moving the hob or hob spindle in a direction generally parallel with its axis of rotation, or, in other words, in a direction tangentially of the work for the purpose of successively bringing different sections of the hob into cutting position.

The present invention resides in certain novel details of construction, and combinations and arrangements of parts, and further objects and advantages thereof will be apparent from the following description of the preferred embodiment thereof described with reference to the accompanying drawings forming a part of this specification in which similar reference characters designate corresponding parts throughout the several views and in which—

Fig. 1 is a perspective view of a hobbing machine embodying the present invention;

Fig. 2 is a front elevation of the central part of the machine shown in Fig. 1, with portions broken away and the hob head in a horizontal position;

Fig. 3 is a side elevation of that part of the machine which is shown in Fig. 2, also with the hob head in a horizontal position;

Fig. 4 is a section on the line 4—4 of Fig. 3; and

Figure 5:
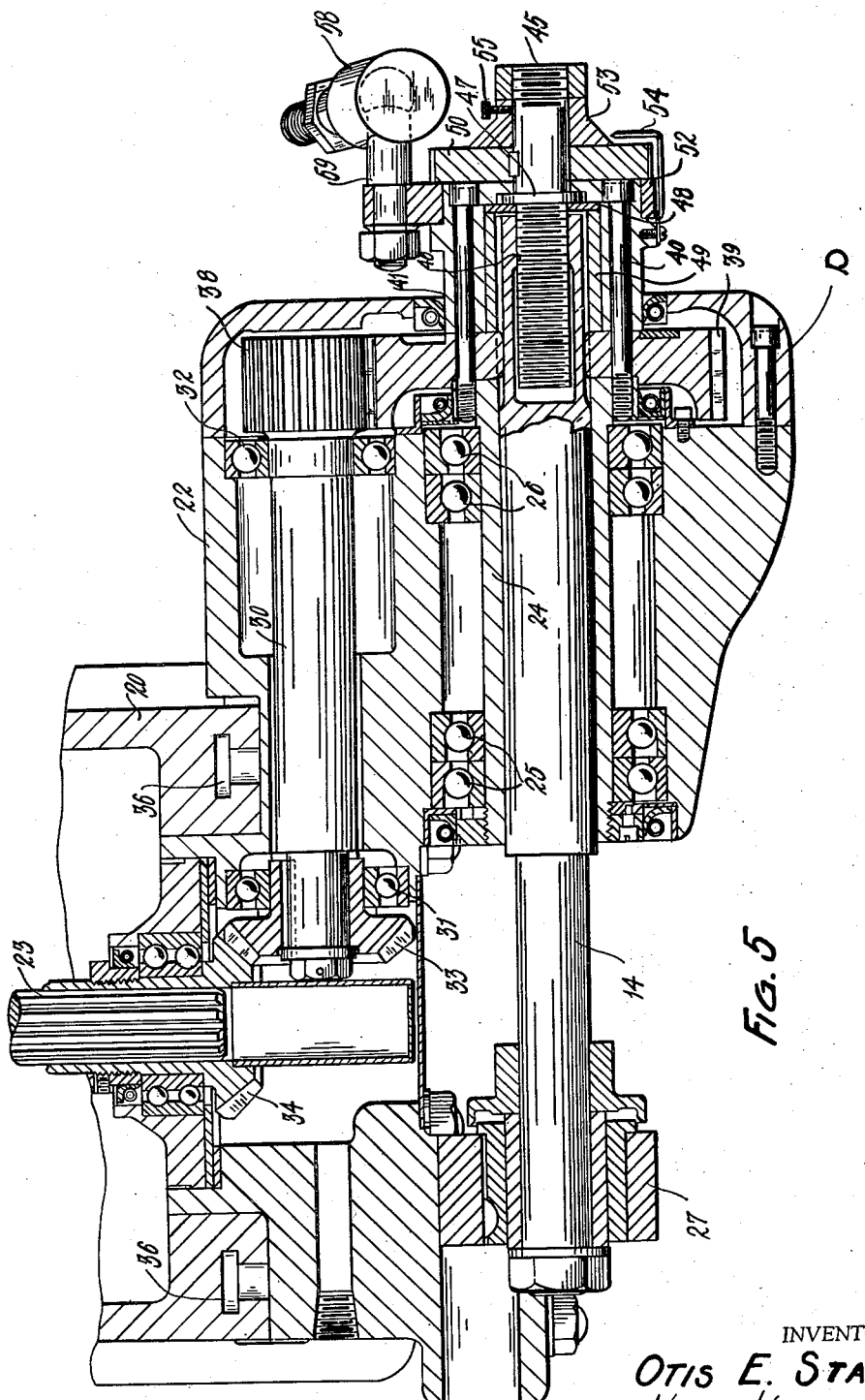
Fig. 5 is a section on the lines 5—5 of Figs. 2 and 3.

While the invention is susceptible of various modifications and alternative constructions, it is herein illustrated and described as embodied in a hobbing machine of the type shown and described in a co-pending application of Frank H. Adams, entitled Hobbing machine, Serial No. 729,118, filed June 5, 1934. For the most part, the hobbing machine shown is old and well known in the art, and only that part thereof which is necessary to a complete understanding of the present invention is herein shown and described in detail. Reference is made to the aforesaid copending application for a complete description of that part of the machine not herein shown and described.

Briefly stated, the machine shown is of generally vertical construction and comprises a frame A supported on a base B which also serves as a sump for the cutting fluid employed in the cutting operation. The work head C is slidably supported on spaced vertical ways 10 and 11 formed integral with the front face of the frame A at the top and bottom thereof, respectively. The work is adapted to be supported between a tail stock carried by a tail stock slide 12 vertically movable along ways formed on the work head C and the upper end of a work spindle 13 rotatably supported in the work head C and driven in predetermined timed relation to the rotation of the hob or tool spindle 14, hereinafter more specifically referred to, by a main drive motor housed in the frame A and operatively connected to said spindles in a manner already known in the art. The work head C is adapted to be moved vertically along the ways 10 and 11 to advance or feed the work to the tool or hob through the medium of a cooperating lead screw and nut rotatably secured to the work head C and the base B respectively. The lead screw is located within the chip guard 15 and is adapted to be driven at a relatively slow speed in predetermined timed relation to the rotation of the tool and the work spindles from the work spindle drive.

The nut which cooperates with the lead screw is rotatably supported in a housing 16 bolted or otherwise secured to the base B and is adapted to be rotated at a relatively high speed through the medium of a self-locking worm and worm wheel drive by a high speed reversible motor located within the lower part of the frame A. The control for the motor is preferably similar to that disclosed in the aforesaid copending application, and, for the purposes of the present application, it will be sufficient to say that the construction is such that the work is brought up to the tool or hob with a comparatively quick motion, after which the movement of the work head is continued at a relatively slow feeding motion until the cutting operation is completed, whereupon the feed is stopped and the blank removed from the work spindle, after which the head is returned to its original down position by a rapid traverse movement.

The tool or hob head, designated generally by the reference character D, comprises a tool or hob head slide 20 supported on horizontal ways 21 formed integral with the frame A intermediate the vertical ways 10 and 11, and a tool or hob head housing 22 rotatably supported by the hob head slide 20 coaxially with the main drive shaft 23 of the machine, see Fig. 5. The right-hand end of the tool or hob spindle 14 is slidably supported in a tubular shaft 24 rotatably supported in the hob head housing 22 by anti-friction bearings 25 and 26, and the left-hand end thereof is rotatably supported in a bracket 27 slidably supported by the left-hand end of the tool or hob head housing 22. The tool or hob spindle 14 and the cylindrical shaft 24 are adapted to be driven from the main drive shaft 23 of the machine through the medium of an intermediate jack shaft 30 rotatably supported in the tool or hob head housing 22 by anti-friction bearings 31 and 32. The left-hand end of the jack shaft 30 carries a bevel gear 33 fixed thereto and which is continuously in mesh with a bevel gear 34 rotatably supported in the hob head slide 20 and splined to the main drive shaft 23. The construction is such that the tool or hob head housing 22 may be adjusted or rotated about the axis of the main drive shaft 23 and secured in any position to which it might be adjusted by means of bolts 35 the heads of which are engaged in cylindrical T-slots 36 and the shanks of which extend through the tool or hob head 22 and are provided on the exterior thereof with nuts 37.

The right-hand end of the jack shaft 30 is provided with a pinion 38 formed integral thereon and which is continuously in mesh with a spur gear 39 bolted to the right-hand end of the tubular shaft 24 by bolts 40 projecting therethrough and through a cap-like member 41 secured thereby to the right-hand end of the tubular shaft 24 outside of the gear 39. The heads of the bolts 40 are countersunk in the member 41 and the other ends thereof are threaded into tapped apertures in a flange formed on the right-hand end of the tubular shaft 24. The gear 30 has a splined connection with the right-hand end of the tool or hob spindle 14, and the construction is such that the tool or hob spindle 14 and the tubular shaft 24 are secured in predetermined relative angular position with reference to each other by means of the gear 39 and the bolts 40. Both the sleeve 24 and the tool or hob spindle or arbor 14 are driven independently of each other from the gear 39, the tool or hob spindle through its spline connection with the gear, and the tubular shaft 24 through the bolts 40.

Hobs used in present day production work are usually made longer than would be necessary to cut the work with which they are intended to be used, from which it follows that, as that part or section of the hob which is cutting in any given set-up becomes dull, it is only necessary to shift the hob in the general direction of its axis of rotation, that is, in a direction tangentially of the work, to present a new section of the hob to the work. This materially increases production as it greatly reduces the time spent in changing and grinding hobs. According to the provisions of the present invention, the tool or hob is automatically moved periodically in the general direction of its axis of rotation to bring successive sections of the hob into cutting position. In the preferred embodiment of the invention shown, this operation is accomplished by moving the tool or hob spindle 14 axially within the tubular shaft or sleeve 24, the gear 39, and the member 41, periodically for the purpose of changing the position of the hob transversely of the axis of rotation of the work spindle. A threaded shaft 45 rotatably supported in the member 41 has a threaded engagement with the right-hand end of a counterbore 46 formed in the right-hand end of the tool or hob spindle 14 by virtue of which the spindle 14 is moved axially upon rotation of the member 45. Longitudinal movement of the shaft 45 relative to the cap 41 and in turn the gear 39, etc., is presented by a flange 47 formed integral therewith which flange is retained in a recess formed in the bottom of the cap-like member 41 by a disk or washer-like member 48 secured in the bottom of the member 41 by a spacing collar or sleeve 49 the left-hand end of which abuts the right-hand side of the gear 39. The right-hand end of the shaft 45 is provided with a ratchet wheel 50 keyed thereto which ratchet wheel is adapted to cooperate with a pawl 51 carried by a member 52 rotatably supported about the outside of the member 41 and secured against longitudinal movement relative thereto by a flange formed integral with the member 41 on one side and the ratchet wheel 50 on the other side. The ratchet wheel 50 is keyed to the shaft 45 and to the right thereof is a graduated dial 53 which cooperates with a pointer 54 fixed to the member 41 and upon which the feed or setting of the hob, etc., can be read. The dial 53 is rotatable on the shaft 45 but can be secured in any desired position by a thumbscrew 55.

The member 52 is operatively connected to the upper end of a vertically extending adjustable connecting link 58 through the medium of a short shaft 59 fixed in a suitable aperture in the member 52, which shaft has a ball and socket connection with the upper end of the link 58. The lower end of the link 58 is connected through the medium of a ball and socket joint, to the forward end of a horizontal short shaft 60 carried by the forward end of a lever 61 pivoted as at 62 to the frame of the machine. The lever 61 carries a roller 63 located intermediate its end and so positioned as to cooperate with or be engaged by a cam member 64 formed on a star or ratchet wheel 65 upon each rotation of the latter. The ratchet wheel 65 is rotatably supported in a bracket 66 fixed to the frame A, and is adapted to be advanced or rotated in a counterclockwise direction as viewed in Figs. 1 and 3 by a counterweighted pawl 67 pivotally supported by a bracket 68 bolted to the work head C. The construction is such that as the work head C reciprocates vertically the pawl 67 advances the star or ratchet wheel 65, upon each revolution of which star or ratchet wheel the cam 64 thereon engages the roller 63 carried by the lever 61, thereby raising or lifting the lever 61 which in turn, and through the medium of the connecting link 58, rotates the pawl 51 and the star or ratchet wheel 50 in a counterclockwise direction as viewed in Fig. 4. Rotation of the star or ratchet wheel 50 in the aforesaid direction shifts the tool or hob spindle 14 in the desired direction a predetermined or definite amount.

In the embodiment of the invention herein shown, the star wheel 65 is advanced one step, or one tooth, upon each reciprocation of the work head C, and since there is only one cam 64 on the star wheel, which has ten teeth, it follows that the hob is advanced only upon each ten reciprocations of the work head, but it will be understood that any desired arrangement of feed may be obtained. The number of teeth on the star or ratchet wheel 65 may be varied or a plurality of cams similar to the cam 64 may be affixed thereto. Various modifications of the construction shown will readily suggest themselves to those skilled in the art to which the present invention relates. It is also to be noted that the pawl 51 can be raised and the ratchet wheel and shaft 45 rotated manually in either direction either in setting up the machine or at any time during its operation.

From the foregoing description of the preferred embodiment of the invention, it will be apparent that the objects hereinbefore referred to have been accomplished and that a hobbing machine has been provided comprising means for periodically and automatically effecting a relative movement between the hob or hob spindle and the work spindle transversely of the axis of rotation of the work spindle. While the preferred embodiment of the invention has been shown and described in considerable detail, it is merely illustrative thereof, and I do not wish to be limited to the particular construction shown which may be varied within the scope of the invention, and I particularly point out and claim as my invention the following:

1. In a hobbing machine the combination of a rotatable work spindle, a rotatable tool or hob spindle, means for producing relative feed movement between said spindles in a direction parallel with the axis of rotation of the work spindle and transversely of the axis of rotation of the hob spindle, intermittent movement mechanism for periodically producing relative movement between said spindles in a direction generally parallel with the axis of rotation of the tool or hob spindle, and means for actuating said intermittent movement mechanism in timed relation to said feed movement.

2. In a hobbing machine, the combination of a rotatable work spindle, a rotatable tool or hob spindle, means for rotating said spindles in predetermined timed relation to each other, means for producing relative linear movement between said spindles in a direction parallel with the axis of rotation of the work spindle, intermittent movement mechanism for periodically producing relative movement between said spindles in a direction generally parallel with the axis of rotation of the tool or hob spindle, and means actuated by said relative linear movement between said spindles in a direction parallel with the axis of rotation of the work spindle for controlling said intermittent movement mechanism.

3. In a hobbing machine the combination of a frame, a work head supported by said frame, a work spindle rotatably supported by said work head, a tool or hob head supported by said frame, a tool or hob spindle rotatably supported by said tool or hob head, means for rotating said spindles in predetermined timed relation, means for producing relative feed movement between said heads in a direction parallel to the axis of rotation of said work spindle, intermittent movement mechanism for periodically producing relative movement between said spindles in a direction generally parallel to the axis of rotation of the tool or hob spindle, and means for actuating said intermittent movement mechanism in timed relation to said feed movement.

4. In a hobbing machine the combination of a frame, a work head slidably supported on said frame, a work spindle carried by said work head, a tool or hob spindle rotatably supported by said frame, means for rotating said spindles in predetermined timed relation, means for moving said work head in a direction to produce a feed movement between said spindles parallel with the axis of rotation of the work spindle, intermittent movement mechanism for periodically moving said tool or hob spindle axially, and means for actuating said intermittent movement mechanism in timed relation to said feed movement.

5. In a hobbing machine the combination of a frame, a work head slidably supported on said frame, a work spindle carried by said work head, a tool or hob spindle rotatably supported by said frame, means for rotating said spindles in predetermined timed relation, means for moving said work head in a direction to produce a feed movement between said spindles parallel with the axis of rotation of the work spindle, and intermittent movement mechanism controlled by the movement of said work head for periodically moving said tool or hob spindle axially.

6. In a hobbing machine, the combination of a frame, a work head slidably supported on said frame, a work spindle carried by said work head, a tool or hob spindle rotatably supported by said frame, means for rotating said spindles in predetermined timed relation, means for moving said work head in a direction to produce a feed movement between said spindles parallel with the axis of rotation of the work spindle, and intermittent movement mechanism actuated by the movement of said work head for periodically moving said tool or hob spindle axially.

7. In a hobbing machine the combination of a frame, a work head slidably supported on said frame, a work spindle rotatably supported by said work head, a tool or hob head carried by said frame, a tubular member rotatably supported by said tool or hob head, a tool or hob spindle slidably supported within said tubular member, means for rotating said spindles in predetermined timed relation, means for producing relative movement between said work heads to effect a feed movement in a direction parallel to the axis of rotation of the work spindle, and intermittent movement mechanism for periodically moving said tool or hob spindle axially within said member.

8. In a hobbing machine the combination of a frame, a work head slidably supported on said frame, a work spindle carried by said work head, a tool or hob head carried by said frame, a tool or hob spindle rotatably and slidably supported by said tool or hob head, means for rotating said spindles in predetermined timed relation, a threaded member rotatably supported in said tool or hob head and operatively connected with said tool or hob spindle, means for producing relative movement between said work heads to effect a feed movement in a direction parallel to the axis of rotation of the work spindle, and intermittent movement mechanism controlled by the movement of said work head for periodically rotating said threaded member to move said tool or hob spindle axially.

9. In a hobbing machine the combination of a frame, a work head slidably supported on said frame, a work spindle carried by said work head, a tool or hob head carried by said frame, a tool or hob spindle rotatably and slidably supported by said tool or hob head, means for rotating said spindles in predetermined timed relation, a threaded member rotatably supported in said tool or hob head and operatively connected with said tool or hob spindle, a member rotatably supported by said tool or hob head adjacent said threaded member, a one-way driving connection between said members, and means actuated by the movement of said work head for periodically oscillating said second mentioned member.

OTIS E. STAPLES.